US012078775B2

(12) United States Patent
Shapiro et al.

(10) Patent No.: US 12,078,775 B2
(45) Date of Patent: Sep. 3, 2024

(54) OCEAN WEATHER FORECASTING SYSTEM

(71) Applicant: Sofar Ocean Technologies, Inc., San Francisco, CA (US)

(72) Inventors: Evan Shapiro, San Francisco, CA (US); Tim Janssen, Montara, CA (US); Pieter Smit, Stanford, CA (US)

(73) Assignee: Sofar Ocean Technologies, Inc., San Francisco, CA (US)

( * ) Notice: Subject to any disclaimer, the term of this patent is extended or adjusted under 35 U.S.C. 154(b) by 319 days.

(21) Appl. No.: 17/279,477

(22) PCT Filed: Sep. 26, 2019

(86) PCT No.: PCT/US2019/053298
§ 371 (c)(1),
(2) Date: Mar. 24, 2021

(87) PCT Pub. No.: WO2020/131187
PCT Pub. Date: Jun. 25, 2020

(65) Prior Publication Data
US 2022/0003894 A1    Jan. 6, 2022

Related U.S. Application Data

(60) Provisional application No. 62/737,090, filed on Sep. 26, 2018.

(51) Int. Cl.
*G01W 1/10*    (2006.01)
*G01W 1/00*    (2006.01)
(Continued)

(52) U.S. Cl.
CPC ............. *G01W 1/10* (2013.01); *G06N 3/045* (2023.01); *G06N 3/08* (2013.01); *G01W 1/00* (2013.01);
(Continued)

(58) Field of Classification Search
CPC .............. G01W 1/10; G01W 2203/00; G01W 2001/006; G01W 1/18; G01W 1/00;
(Continued)

(56) References Cited

U.S. PATENT DOCUMENTS 4,429,652 A    2/1984 Stol
5,504,714 A    4/1996 Shonting
(Continued)

FOREIGN PATENT DOCUMENTS

EP            3330747 A1    6/2018
WO      2005012079 A1      2/2005
(Continued)

OTHER PUBLICATIONS

Rodrigues et al. (Deep Downscale: a Deep Learning Strategy for High-Resolution Weather Forecast, IBM Research, Aug. 2018) ( Year: 2018).*

(Continued)

*Primary Examiner* — Daniel R Miller
*Assistant Examiner* — Christian T Bryant
(74) *Attorney, Agent, or Firm* — Kolitch Romano Dascenzo Gates LLC

(57) ABSTRACT

A computer-implemented method for forecasting weather uses a trained machine learning model to determine the error in a weather forecast, e.g., for a selected ocean region. The machine learning model is configured to determine the predicted forecasting error given the weather forecast and a set of existing conditions. The weather forecast is adjusted using the predicted forecasting error to produce an augmented weather forecast. Training the machine learning model may include the utilization of hindcasting methods. Determination of existing conditions and other modeling may include the use of data from an array of metocean sensor nodes dispersed on a body of water.

20 Claims, 7 Drawing Sheets

(51) Int. Cl.

| | |
|---|---|
| *G01W 1/18* | (2006.01) |
| *G06F 11/00* | (2006.01) |
| *G06N 3/02* | (2006.01) |
| *G06N 3/044* | (2023.01) |
| *G06N 3/045* | (2023.01) |
| *G06N 3/08* | (2023.01) |
| *G06N 3/088* | (2023.01) |
| *G06N 20/00* | (2019.01) |

(52) U.S. Cl.
CPC ........ *G01W 2001/006* (2013.01); *G01W 1/18* (2013.01); *G01W 2203/00* (2013.01); *G06F 11/00* (2013.01); *G06N 3/02* (2013.01); *G06N 3/044* (2023.01); *G06N 3/088* (2013.01); *G06N 20/00* (2019.01); *Y02A 90/10* (2018.01)

(58) Field of Classification Search
CPC .......... G06N 3/045; G06N 3/08; G06N 3/044; G06N 3/088; G06N 20/00; G06N 3/02; Y02A 90/10; G06F 11/00
See application file for complete search history.

(56) References Cited

U.S. PATENT DOCUMENTS

| | | | |
|---|---|---|---|
| D440,171 S | 4/2001 | Berger-North et al. | |
| 7,789,723 B2 | 9/2010 | Dane et al. | |
| 10,996,374 B1* | 5/2021 | Nazir | G06N 7/01 |
| 2005/0279268 A1 | 12/2005 | Storteig et al. | |
| 2008/0148839 A1 | 6/2008 | Tillotson et al. | |
| 2008/0169975 A1 | 7/2008 | Yee | |
| 2009/0265104 A1 | 10/2009 | Shroff | |
| 2011/0060525 A1 | 3/2011 | Teng et al. | |
| 2012/0095629 A1 | 4/2012 | Fjellstad et al. | |
| 2013/0222115 A1 | 8/2013 | Davoodi et al. | |
| 2015/0019185 A1 | 1/2015 | Cunningham et al. | |
| 2015/0025804 A1 | 1/2015 | Jones et al. | |
| 2015/0317589 A1 | 11/2015 | Anderson et al. | |
| 2016/0027308 A1 | 1/2016 | Hine | |
| 2017/0124432 A1 | 5/2017 | Chen et al. | |
| 2017/0131435 A1 | 5/2017 | Peacock et al. | |
| 2017/0343702 A1 | 11/2017 | Radich et al. | |
| 2018/0038994 A1 | 2/2018 | Hamann et al. | |
| 2018/0045855 A1 | 2/2018 | Dow et al. | |
| 2019/0064392 A1* | 2/2019 | Feng | G06Q 50/06 |

FOREIGN PATENT DOCUMENTS

| | | |
|---|---|---|
| WO | 2013055207 A1 | 4/2013 |
| WO | 2015187743 A1 | 12/2015 |

OTHER PUBLICATIONS

Lauret et al. (A Neural Network Post-processing Approach to Improving NWP Solar Radiation Forecasts, Energy Procedia, vol. 57, 2014, pp. 1044-1052, ISSN 1876-6102, https://doi.org/10.1016/j.egypro.2014.10.089.) (Year: 2014).*

Marzban (Neural Networks for Post-processing Model Output: ARPS. Monthly Weather Review. 2002. 131. 10.1175/1520-0493(2003)131<1103:NNFPMO>2.0.CO;2) (Year: 2002).*

Isaksson ("Reduction of Temperature Forecast Errors with Deep Neural Networks.". Uppsala University, Disciplinary Domain of Science and Technology, Earth Sciences, Department of Earth Sciences, Luval. May 2018 (Year: 2018).*

Zhang et al. (Are hybrid models integrated with data preprocessing techniques suitable for monthly streamflow forecasting? Some experiment evidences, Journal of Hydrology, vol. 530, 2015, pp. 137-152, ISSN 0022-1694, https://doi.org/10.1016/j.jhydrol.2015.09.047.) (Year: 2015).*

Sivareddy (A Study on Global Ocean Analysis from an Ocean Data Assimilation System and its Sensitivity to Observations and Forcing fields. Nov. 2015. 10.13140/RG.2.1.4459.4326) (Year: 2015).*

Eden et al. ("Downscaling of GCM-Simulated Precipitation Using Model Output Statistics". Journal of Climate 27.1, Jan. 1, 2014, : 312-324. https://doi.org/10.1175/JCLI-D-13-00063.1) (Year: 2014).*

Sonam Singh et al., "Leveraging Convolutions in Recurrent Neural Networks for Doppler Weather Radar Echo Prediction", Springer International Publishing AG, 2017, Part II, LNCS 10262, pp. 310-317.

International Search Report and Written Opinion of the International Searching Authority from the U.S. Receiving Office, dated Jun. 11, 2020, in PCT/US2019/053298, which is the international application which shares the same priority as this U.S. application.

Lemon et al., "Acoustic Measurements of Wind Speed and Precipitation Over a Continental Shelf", article, Journal of Geophysical Research, published May 20, 1984, vol. 89, pp. 3462-3472, American Geophysical Union (AGU), Washington, D.C.

Farmer et al., "Observations of High Frequency Ambient Sound Generated by Wind", excerpt from the book Sea Surface Sound, published 1988, pp. 403-415, edited by B. R. Kerman, Kluwer Academic Publishers, Dordrecht, the Netherlands.

Vagle et al., "An Evaluation of the WOTAN Technique of Inferring Oceanic Winds from Underwater Ambient Sound", article, Journal of Atmospheric and Oceanic Technology, published Aug. 1990, vol. 7, pp. 576-595, American Meteorological Society (AMS), Boston, MA.

Ding et al., "Observations of Breaking Surface Wave Statistics", article, Journal of Physical Oceanography, published Jun. 1994, vol. 24, pp. 1368-1387, American Meteorological Society (AMS), Boston, MA.

Juszko et al., "Wind Stress from Wave Slopes Using Phillips Equilibrium Theory", article, Journal of Physical Oceanography, published Feb. 1995, vol. 25, pp. 185-203, American Meteorological Society (AMS), Boston, MA.

Felizardo et al., "Correlations between Ambient Noise and the Ocean Surface Wave Field", article, Journal of Physical Oceanography, published Apr. 1995, vol. 25, pp. 513-532, American Meteorological Society (AMS), Boston, MA.

Zedel et al., "Ocean Ambient Sound Instrument System: Acoustic Estimation of Wind Speed and Direction from a Subsurface Package", published Aug. 1999, vol. 16, pp. 1118-1126, American Meteorological Society (AMS), Boston, MA.

Ma et al., "Prediction of underwater sound levels from rain and wind", article, The Journal of the Acoustical Society of America, published Jun. 2005, vol. 117, pp. 3555-3565, Acoustical Society of America (ASA), Melville, NY.

Manasseh et al., "Passive Acoustic Determination of Wave-Breaking Events and Their Severity across the Spectrum", article, Journal of Atmospheric and Oceanic Technology, published Apr. 2006, vol. 23, pp. 599-618, American Meteorological Society (AMS), Boston, MA.

I. R. Young, "Directional spectra of hurricane wind waves", article, Journal of Geographic Research, published Aug. 29, 2006, vol. III, American Geophysical Union (AGU), Washington, D.C.

Hydrosphere, "Hydrosphere Company Profile", E&OE Sol_Pow_V.2.00_Dec_2012, dated Dec. 31, 2012, and could be located at http://hydrosphere.co/uk/datasheets/brochure/HydrospherePIP.pdf on May 22, 2018.

Thomson et al., "Waves and the equilibrium range at Ocean Weather Station P", article, Journal of Geophysical Research: Oceans, published Nov. 8, 2013, vol. 118, pp. 5951-5962, American Geophysical Union (AGU), Washington, D.C.

U.S. Receiving Office, International Search Report and Written Opinion of the International Searching Authority in PCT/US2018/023661, dated Jul. 5, 2018, which is an international application of Applicant Spoondrift Technologies, Inc.

* cited by examiner

OCEAN WEATHER FORECASTING SYSTEM

CROSS-REFERENCES

This application claims the benefit under 35 U.S.C. § 119(e) of the priority of U.S. Provisional Patent Application Ser. No. 62/737,090, filed Sep. 26, 2018, the entirety of which is hereby incorporated by reference for all purposes.

FEDERALLY SPONSORED RESEARCH OR DEVELOPMENT

One or more aspects or embodiments of the invention(s) described herein were made in the performance of work under grant number N00014-16-1-2856 awarded by the Office of Naval Research (ONR) of the United States Department of the Navy. The government of the United States of America may have certain rights in the invention.

FIELD

The disclosure relates to the systems and methods for remote measurement, monitoring and forecasting of sensed quantities such as wind, wave and current motions of the marine boundary layer, within bodies of water.

INTRODUCTION

The marine boundary layer, loosely defined as the upper sixty meters (m) of the ocean and the lower 100 m of the atmosphere, is a region of intense global economic activity, including, e.g., global shipping, offshore industry, coastal recreation, marine renewable energy, and global fisheries. High-fidelity observations and forecasts of ocean weather (e.g., waves, wind, currents, physical water properties) are essential for efficiency and safety of our many economic activities in the ocean, both in coastal areas and pelagic zones. Moreover, improved sensing capability and forecasting accuracy will lead to better understanding of global ocean dynamics and air-sea interaction, improve our ability to adapt to changes in ocean climatologies, and better predict the dynamics of our coastlines and coastal habitats.

Traditionally, sensing of ocean weather, including ocean waves, ocean surface wind, surface currents, and physical water properties (e.g., temperature, salinity), is expensive, complex, and requires highly specialized equipment to deploy and maintain. As a result, ocean weather data is only sparsely available along the world's coastlines, and practically nonexistent in the open ocean.

SUMMARY

The present disclosure provides systems, apparatuses, and methods relating to improved weather forecasting in ocean environments.

In some embodiments, a computer-implemented method for forecasting weather may include: using a trained machine learning model to determine a predicted forecasting error in a weather forecast, wherein the machine learning model is configured to determine the predicted forecasting error given the weather forecast and a set of existing conditions; and adjusting the weather forecast using the predicted forecasting error to produce an augmented weather forecast.

In some embodiments, a system for forecasting weather may include: one or more processors; a memory; and a plurality of instructions stored in the memory and executable by the one or more processors to forecast a weather state for a selected geographical region by: receiving, as an input, a first forecast of the weather state for the selected geographical region and a nowcast for the selected geographical region; using the first forecast and the nowcast as inputs to a trained machine learning model, predicting a forecasting error associated with the first forecast; and generating a second forecast by adjusting the first forecast using the predicted forecasting error.

In some embodiments, a system for forecasting weather may include: one or more processors; a memory; and a plurality of instructions stored in the memory and executable by the one or more processors to train a machine learning model by: generating a first hindcast of a first historical weather state for a selected geographical region and a first selected timeframe; generating a second hindcast of a second historical weather state for the selected geographical region and a second selected timeframe; generating a reforecast of the second historical weather state for the selected geographical region, using a weather forecast model and a first set of data associated with conditions prior to the first selected timeframe, such that an actual forecasting error is defined as a difference between the reforecast and the second hindcast; and training the machine learning model to estimate a predicted forecasting error, given the first hindcast and the reforecast as inputs.

Features, functions, and advantages may be achieved independently in various embodiments of the present disclosure, or may be combined in yet other embodiments, further details of which can be seen with reference to the following description and drawings.

DETAILED DESCRIPTION

Figure 1:
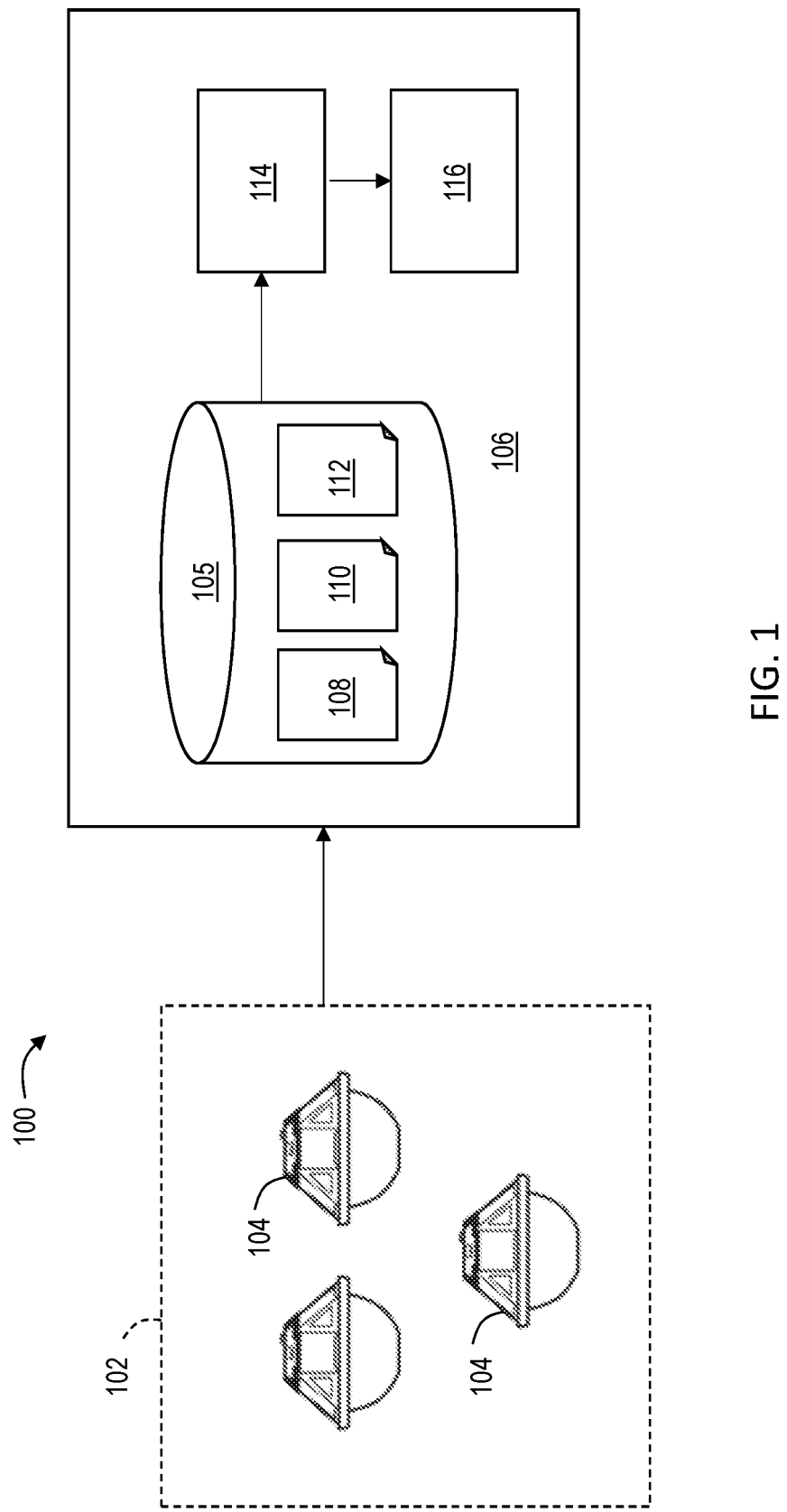
FIG. 1 is a schematic view of an illustrative weather forecasting system according to aspects of the present teachings.

Various aspects and examples of a weather forecasting system and associated methods are described below and illustrated in the associated drawings. Unless otherwise specified, a weather forecast system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

"Providing," in the context of a method, may include receiving, obtaining, purchasing, manufacturing, generating, processing, preprocessing, and/or the like, such that the object or material provided is in a state and configuration for other steps to be carried out.

"Hindcast" refers to an analysis attempting to recreate weather conditions (e.g., ocean or metocean) that lie in the past, possibly up to the now. Hindcasts may or may not include observations.

"Reanalysis" refers to a model hindcast that includes observations. The reanalysis recreates model conditions in the past, but incorporates any observations that are available to correct or adjust the model to better fit with those observations.

"Operational Reanalysis" refers to a hindcast that follows real-time as closely as possible, while including observations. For example, an operational reanalysis may be used to predict what the weather is now, given what it was six hours ago. In that case, any observations collected in the intermediate timeframe may be utilized to adjust the reanalysis to better fit those observations. Operational reanalysis is typically not as good as a normal reanalysis, because not all observations arrive within the short window (e.g., six hours in the current example). For example, weather balloon data, and certain satellite products may only become available a few days after the fact.

"Operational Forecast" is a simulation that starts from the last operational analysis, and predicts into the future. No further observational data is used, because such data is unavailable.

"Reforecast" is a recreation of a forecast in the past, as if it is a real forecast. In other words, a reforecast may be conducted for Jan. 1, 2017, using only data that would be available to a real operational forecasting system at the time.

Overview

The dynamics of the air-sea interface, responsible for the exchange of momentum, heat, water, and gas between the atmosphere and ocean, are driven by actions (e.g., breaking) of ocean waves, surface winds, surface currents, physical properties of the water and air (e.g., temperature, salinity, humidity, barometric pressure), and precipitation. The measurement of meteorological and oceanographic (AKA metocean) characteristics is important for understanding air-sea dynamics, quantifying ocean-atmosphere exchange processes, and improving weather and wave models. Metocean characteristics may include wave motions, current motions, physical properties of air and water, wind speed, wind direction, precipitation, fog, etc.

As mentioned above, direct observational ocean weather data is only sparsely available along the world's coastlines, and practically nonexistent in the open ocean. Driven in part by this lack of data, operational ocean weather forecasting relies almost exclusively on process-based numerical models that numerically approximate the governing physical relations. Errors in model forecasts are a combination of the uncertainty in boundary and initial conditions (lack of data), and the accumulation of small model errors due to e.g., incomplete representation of physical processes, finite model resolutions (grids), and parametrization of sub-grid processes (e.g., fine-scale turbulence). As a consequence, when applied in regions with limited observations (large uncertainty in initial state) and propagated over long distances and time, model errors can grow to be very large (for instance, 50-100% error in wave height for remote swell predictions is not unusual).

In general, a weather forecasting system according to the present disclosure includes an observation and sensing network along with one or more servers having processors configured to process data from the observation and sensing network, and combine that with physics-based forecast using a machine learning model. The observation and sensing network comprise an array of real-time ocean sensors configured to measure ocean weather observations, such as wave dynamics, ocean surface currents, ocean surface winds, ocean surface temperatures, water properties, and/or the like. The ocean sensors may be stationary and/or moored, for example tethered to the sea floor. Additionally, or alternatively, the ocean sensors may be free-drifting, free-floating, or self-propelled, and/or may change position over time. Ocean sensors of the present disclosure may be considered autonomous, in that the sensors are self-positioning and/or have onboard data processing.

The ocean sensors transmit the ocean weather observation data in real time or near real time to a backend data management system. The transmission of observation data may be through a hard-wired connection and/or wireless (e.g., utilizing satellite telemetry). The observation data is assimilated into a machine learning model trained to predict forecast error and therefore facilitate a more accurate forecast. For example, forecast accuracy may be improved by first forecasting future metocean states using a global physical ocean weather forecast model and sensor data. The forecast is then corrected using the predicted error determined by the machine learning model, thereby generating an enhanced weather forecast.

The system assimilates weather data from the network of drifting, autonomously positioning, self-propelled, vessel-based, and/or stationary ocean sensors and forecast models, using a machine learning model. The machine learning module has been trained to reduce weather forecast uncertainty by inferring future ocean states from assimilation of global weather model data and real-time sensor data. In coastal locations, multiple ocean sensors present within a region of interest drive a local physics-based model that provides real-time observations of the directional wave state that in turn are used to enhance forecasting and improve resolution and accuracy of ocean weather nowcasting and forecasting, further providing an improvement in data availability and forecast quality.

The present disclosure utilizes the improvement in data availability and forecast quality due to the deployment of the ocean sensors and assimilation of observational data in conjunction with global numerical forecasting models for ocean wind, waves, and currents. The forecasting models may include any suitable weather forecasting model, such as physics-based models, statistics-based models, and/or the like. For example, the forecasting models may include Global Forecasting System (GFS), WaveWatch III, Hycom, Simulating WAves Nearshore (SWAN), and/or other numerical models. The assimilation of these sensor data and forecasting model data streams may utilize the machine learning model trained on the model-data error space to correct for model errors based on available data from the sensor array. This may effectively constrain historical and present states of the air-sea interface processes to reduce forecast uncertainty, and correct errors utilizing all available historical data included in the training data set.

Additionally, the present disclosure includes utilizing data from the ocean sensors deployed near the coast to deterministically reconstruct a best fit regional prediction based on observations alone. In situations where forward modeling is utilized, regional models are inferred from global models. This approach feeds errors from the global modeling algorithms into the algorithms for regional models. In contrast, by using a Local Inversion Model (LIM), embodiments of the present disclosure approach regional modeling in the reverse order. Namely, starting with local regional data from the ocean sensors and inferring a global state. The LIM utilizes the data from a localized array of one or more ocean sensors. Utilizing backward raytracing algorithms, data at these observational sites is translated to wave information along the model boundary. In some examples, the global model, corresponding to the LIM data, may serve as an input to the machine learning model described above to drive data-constrained, metocean forecasting.

Technical solutions are disclosed herein for the forecasting of metocean conditions and ocean weather. Specifically, the disclosed systems and corresponding methods address a technical problem tied to weather forecasting technology, arising in the realms of oceanography and meteorology, namely the technical problem of modeling the complex behavior of the air-sea interface. The system and method disclosed herein provides an improved solution to this technical problem through data assimilation techniques and deep learning.

Aspects of the weather forecast system may be embodied as a computer method, computer system, or computer program product. Accordingly, aspects of the weather forecast system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the weather forecast system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects weather forecast system may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the weather forecast system may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/ acts specified in the flowchart and/or block diagram block (s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the weather forecast system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative weather forecast systems as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Weather Forecasting System

Figure 2:
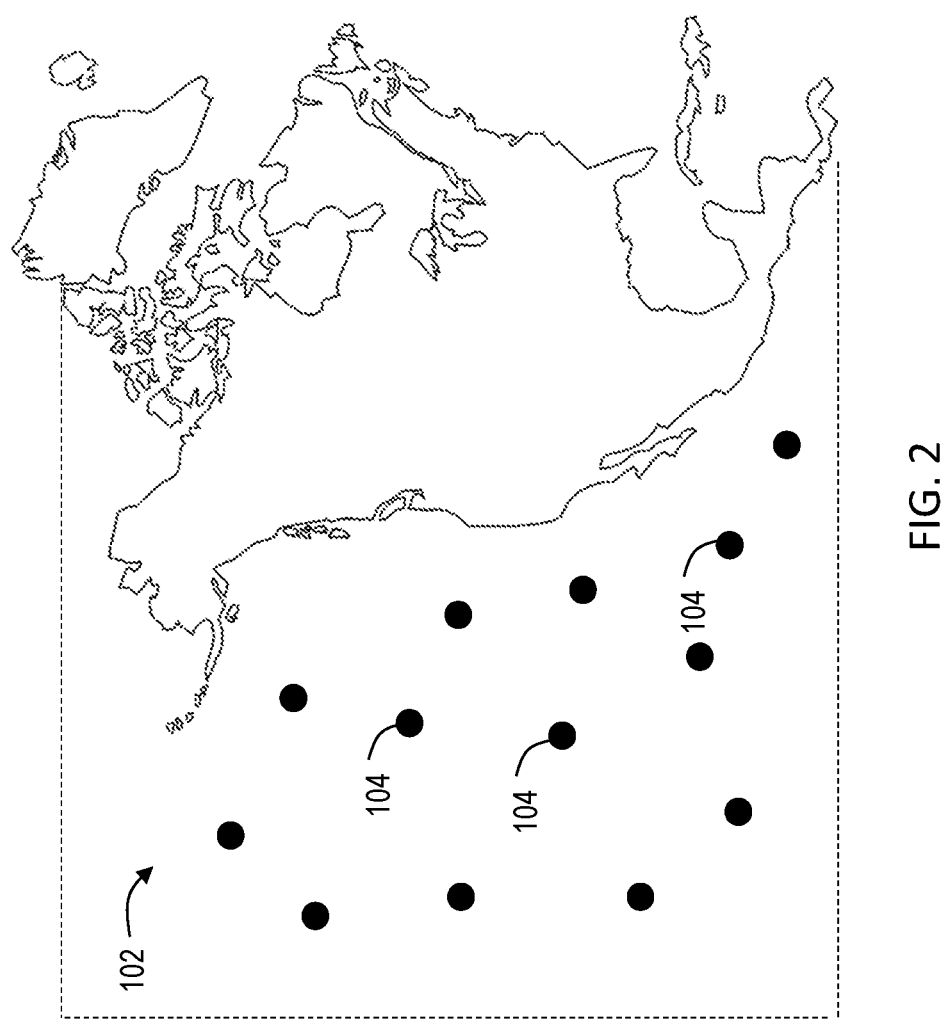
FIG. 2 is a schematic view of an illustrative array of offshore ocean sensors within an ocean region.

As shown in FIGS. 1-2, this section describes an illustrative weather forecasting system. Weather forecasting system 100 is an example of the weather forecasting systems described in the Overview, above.

A sensor array 102 of system 100 includes a plurality of, e.g., autonomous, sensor nodes 104 configured to measure observational data, such as wave dynamics, surface currents, surface winds, and surface temperature (and other physical water and air properties, such as temperature, salinity, humidity, and atmospheric pressure). Any number and/or combination of sensor nodes 104 may be utilized, or specifically constructed for these purposes. Sensor nodes 104 are configured to observe, individually, collectively or in concert with other sensor nodes 104, one or more of the physical parameters (i.e., observational data) described above. Sensor nodes 104 observe motion in the X (east-west), Y (north-south), and Z (vertical) directions, with a defined sampling frequency (e.g., 2 Hz or two samples per second). Additionally, or alternatively, wind may be observed using any suitable method, such as lidar, anemometer, and/or the like. In some examples, wind observations may be obtained through inverse sensing by physics-based and/or machine learning algorithms combined with fast-sampling surface motion tracking of the ocean surface, either individually or in combination with other observations, e.g., collocated hydrophone observations.

Each sensor node 104 transmits measured metocean observational data, e.g., in a raw format or optionally processed on-board, to a memory 105 hosted on one or more servers 106. This transmission may be conducted in real time or near real-time. Such telemetry functionality may be provided through a hardwired connection to a data processing center, and/or the sensor may utilize satellite, cellular or radio frequency telemetry systems. The data may be stored on servers 106 in the backend database system, for example in a table searchable format, for integration with forecasting and inversion procedures identified below.

Sensor nodes 104 may perform advanced on-board data processing to determine metocean characteristics, such as wave height, wave direction, wind speed, wind direction, surface current speed, surface current direction, surface temperature, and/or the like. Sensor nodes 104 transmit data in real time or near real-time to servers 106. Any suitable metocean sensor may be utilized. Examples of suitable sensor nodes are described in U.S. patent application Ser. No. 15/928,041, filed Mar. 21, 2018, the entirety of which is incorporated herein for all purposes.

Individual sensor nodes 104 may be moored in place, freely drifting, autonomously positioning, self-propelled, towed, and/or otherwise carried or moved along the ocean surface. In open ocean regions, sensor array 102, including free-drifting sensor nodes 104, may have a time-varying topology due to normal drift of the sensor nodes due to wind and currents. Additional sensor nodes 104 may be inserted over time to maintain coverage and replace sensor nodes 104 as they reach end-of-life. Lagrangian drift models may be utilized to make best estimates of mean drift patterns to optimize deployment logistics, timing, and location coverage.

Data transmitted by sensor nodes 104 is utilized by a machine learning model 108 (e.g., a deep convolutional neural network), a physics-based local inversion model 110, and a weather forecast model 112. Each of these models, along with the observational data, is executed by one or more processors 114 to produce a weather forecast 116.

B. Illustrative Method of Weather Forecast Augmentation Using a Machine Learning Model and Distributed Sensor Network This section describes steps of an illustrative method 200 for creating a weather forecast utilizing a predictive machine learning model (e.g., a deep convolutional neural network); see FIG. 3. Aspects of weather forecasting system 100 may be utilized in the method steps described below. Where appropriate, reference may be made to components and systems that may be used in carrying out each step. These references are for illustration, and are not intended to limit the possible ways of carrying out any particular step of the method.

Figure 3:
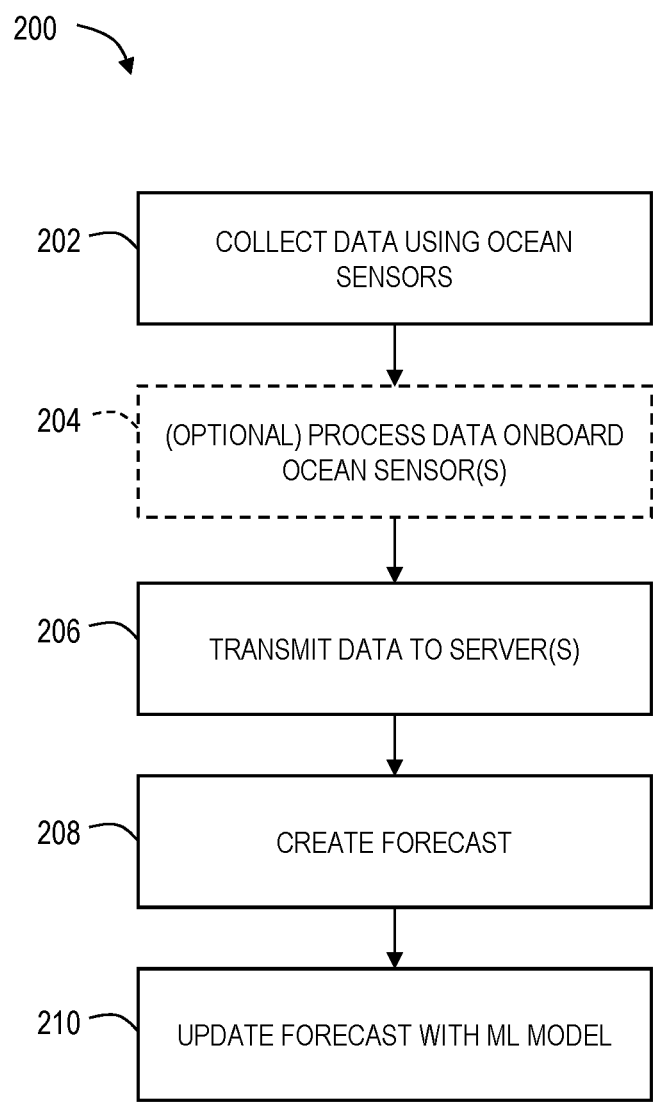
FIG. 3 is a flowchart depicting steps of an illustrative method of weather forecasting using a predictive machine learning model.

FIG. 3 is a flowchart illustrating steps performed in an illustrative method, and may not recite the complete process or all steps of the method. Although various steps of method 200 are described below and depicted in FIG. 3, the steps need not necessarily all be performed, and in some cases may be performed simultaneously or in a different order than the order shown.

Step 202 of method 200 includes collecting data using a plurality of metocean sensors. In other words, metocean conditions are observed and recorded using onboard sensors. This may include any observational data corresponding to ocean weather conditions, received from an array of individual ocean sensors (e.g., sensors nodes 104, described above).

Optional step 204 of method 200 includes processing some or all of the observational data onboard the ocean sensors. This may include one or more processing steps configured to alter the observational data and/or infer or calculate new information based on the observational data collected.

Step 206 of method 200 includes transmitting the data to a server (e.g., servers 106, described above). This may be performed over a hardwired connection and/or wirelessly.

Step 208 of method 200 includes creating a weather forecast from a weather forecast model. The forecast may include the observational data from the ocean sensors as well as any other available data sources (e.g., data from weather balloons, satellites, etc.). The forecast model may be physics-based, statistics-based, and/or the like.

Step 210 of method 200 includes updating the forecast using a predicted forecasting error. The forecasting error is output by a trained predictive machine learning (ML) model. The predictive machine learning model utilized by the present disclosure may include any suitable machine learning architecture, such as a deep learning network architecture (e.g., a convolutional neural network, recurrent neural network, residual encoder-decoder neural network, etc.), trained to predict an error in a weather forecast. The forecast error may be defined as the difference between a true weather state and a forecasted weather state. For example, the difference between the true state and the forecasted state may be determined by various error models such as a simple difference, mean-squared error (MSE), root-mean-square error (RMSE), Taylor diagrams, etc., or any combination thereof.

For the purpose of describing error while training the ML model, a loss function may be utilized, having several error terms. This may include root mean square error (RMSE), Wasserstein, various earth-moving losses, L2 loss, weight decay loss, etc. In some examples, loss terms may be generated using auxiliary neural networks such as a discriminator network. In general, error metrics are utilized to determined different ways of characterizing mean error.

The forecasted state may refer to purely process-based forecasts and/or forecasts that integrate observations into forecasts, e.g., Kalman-filters or Adjoint models. In this manner, the present disclosure does not replace numerical weather forecasting models, but instead considers both global forecast models and sensor data as inference input to determine the inferred future state. This results in a data-augmented or enhanced weather forecast.

By modeling the error system rather than the physics system, the present disclosure is orders of magnitude less complex, remains heavily constrained by the physics of weather models, and can estimate the inferred future state in a single-pass inference, e.g., without having to propagate error sensitivities back through intractable Adjoint models. The error system is generally smooth, spatially and temporally coherent, and is composed of hierarchical scaled abstractions. This makes the problem analogous to image de-noising, in-fill, and up-sampling tasks.

The neural network can be pre-trained on available reforecast and hindcast data. As described above, in this context a reforecast is a forecast of a historical state using only the information that was available at the time of the forecast (thus simulating an actual forecast). In contrast, a hindcast is a simulation of a historical state constrained using more data (e.g., all or substantially all available historical data), including data that was not available at the time of the forecast. During training, sparse (and pseudo-randomized) selections of hindcast data and full-coverage historical reforecast data may be used as inputs by the neural network to infer the best estimate true state. In this case, the best estimate true state is represented by hindcast data.

Figure 4:
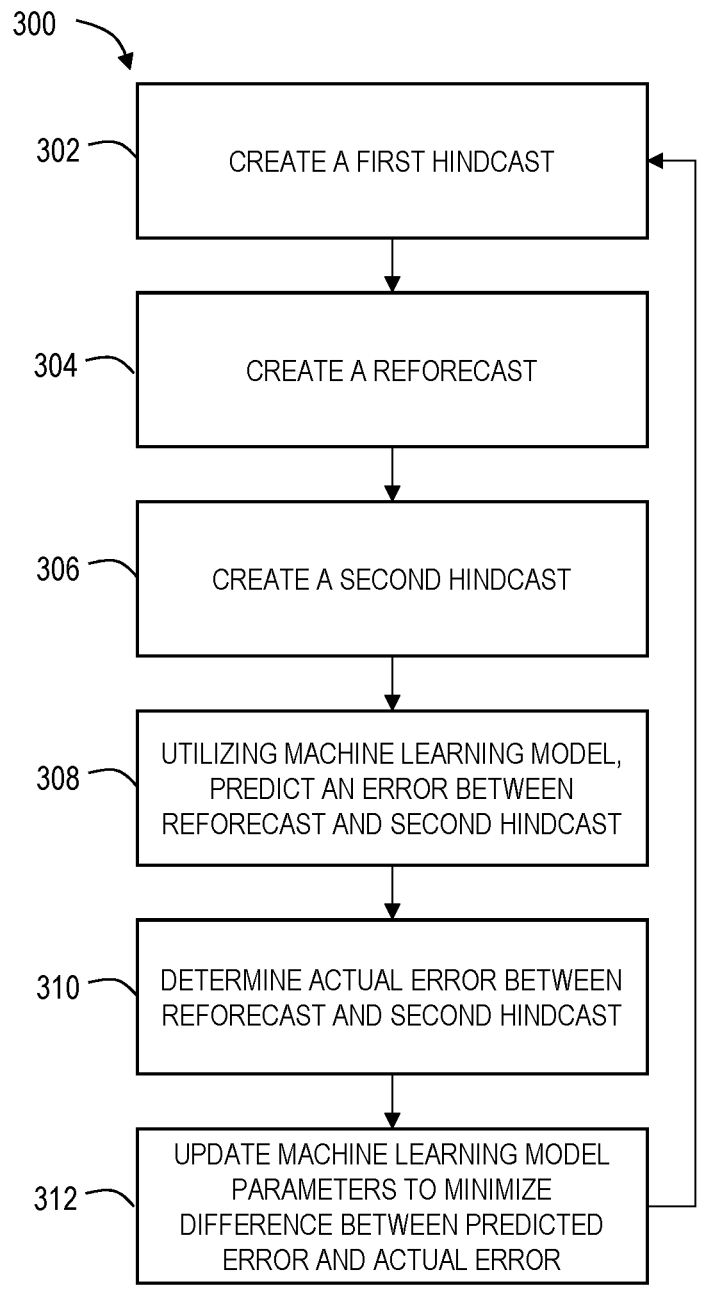
FIG. 4 is a flowchart depicting steps of an illustrative method for training a machine learning model to predict the error of a forecast.

FIG. 4 is a flowchart illustrating steps performed in illustrative method 300 for training the predictive machine learning model, and may not recite the complete process or all steps of the method. Although various steps of method 300 are described below and depicted in FIG. 4, the steps need not necessarily all be performed, and in some cases may be performed simultaneously or in a different order than the order shown.

Step 302 of method 300 includes creating a first hindcast of a first historical weather state for a selected geographical region and a first selected timeframe.

Step 304 of method 300 includes creating a reforecast of a predicted second weather state for the selected geographical region and a second selected timeframe.

Step 306 of method 300 includes creating a second hindcast of the second weather state.

Step 308 of method 300 includes feeding the first hindcast and the reforecast into the machine learning model to determine a predicted error in the reforecast. The error is defined in this training method as a difference between the reforecast and the second hindcast.

Step 310 of method 300 includes determining an actual error between the reforecast and the second hindcast.

Step 312 of method 300 includes updating the machine learning parameters to minimize the difference between the predicted error and the actual error (e.g., through backpropagation).

After training, the machine learning model is configured to produce an estimated error in the forecasting model in response to being provided with a weather forecast and a nowcast. This estimated error may be used to update the forecast (e.g., as in step 210 of method 200). The present nowcast may be determined, in part, by a Linear Inversion Model fed with observational data from the ocean sensors, as described further below.

C. Illustrative Method of Data-Augmented Inversion of Regional Wave Models

Figure 5:
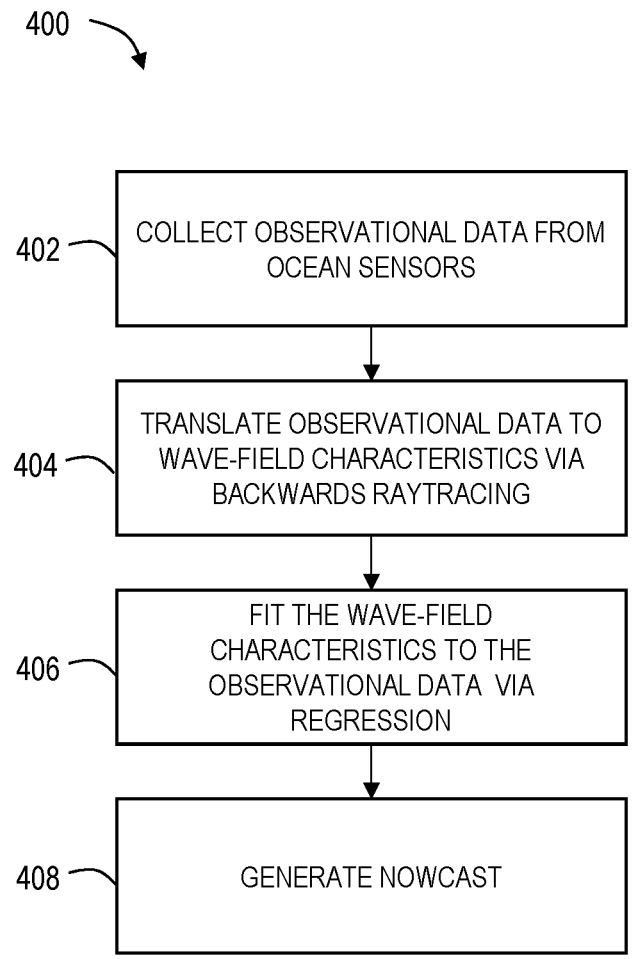
FIG. 5 is a flowchart depicting steps of an illustrative method for generating a nowcast with a Local Inversion Model (LIM).

This section describes steps of an illustrative method 400 for creating a regional ocean wave model from region wave data; see FIG. 5. Aspects of weather forecasting system 100 may be utilized in the method steps described below. Where appropriate, reference may be made to components and systems that may be used in carrying out each step. These references are for illustration, and are not intended to limit the possible ways of carrying out any particular step of the method.

The present embodiment includes obtaining high-resolution regional wave data from a distributed ocean sensor network (e.g., comprising sensor nodes 104 described above). This regional wave data, in conjunction with regional models are utilized to initialize constraining boundaries on a corresponding global model. Traditionally, regional behaviors are inferred from global models, thus feeding errors from the global modeling algorithms into the numerical modeling algorithms for regional models. By using a Local Inversion Model (LIM), regional modeling is approached in the reverse order.

Rather than starting from a global model forecast to estimate the regional offshore wave field, the LIM starts with observational data. For example, observational data determined by an array of one or more ocean sensors. Utilizing a backward raytracing algorithm, data at the corresponding observational sites is translated to wave information along a regional boundary. Each sensor site may provide, for example, five observations of the full directional spectrum (e.g., integrated energy and the lowest four directional moments: a1, b1, a2, b2) at each site, at regular sampling intervals. The four directional moments may be utilized to calculate the four following statistical values of the global wave model: mean, variance, skew and kurtosis.

Using N sensors, and assuming the waves along the boundary are described with M discrete directions, a best estimate (e.g., best regressive fit) of the characteristics of the incident wave-field (that also produces regional behavior consistent with observational data from the sensor readings at observed sites) can be constructed as long as sufficient sensors are deployed (e.g., the resulting linear system may overdetermine the wave-field with 5N>M). This may be achieved even in the case that the sensor network is limited. For instance, if M=18 (e.g., in the case of 10 degrees resolution of the incident half plane), the system would already be overdetermined with four ocean sensors (or more) in the sensor array.

Therefore, each ocean sensor observation constrains the global offshore wave-conditions. The LIM determines what offshore wave-field best reproduces (in a least square sense) the observations from all sensors in the array. Effectively, this approach generates a fully data-constrained solution, without any dependency of global models (and inherent global error propagation). This 'reconstructed' LIM estimate can then be used to drive a regional model to provide a highly accurate nowcast. This regional model and the LIM data may serve as an input to the Data Augmented Forecasting process described above to drive a data-constrained ocean wave forecasting through combination with other data sources.

FIG. 5 is a flowchart illustrating steps performed in illustrative method 400, and may not recite the complete process or all steps of the method. Although various steps of method 400 are described below and depicted in FIG. 5, the steps need not necessarily all be performed, and in some cases may be performed simultaneously or in a different order than the order shown.

Step 402 of method 400 includes collecting observational data from an array of ocean sensors.

Step 404 of method 400 includes translating the observational data to wave-field characteristics corresponding to a boundary of the region through backwards raytracing.

Step 406 of method 400 includes utilizing regression to best fit the wave-field characteristics to the constrained observational data.

Step 408 of method 400 includes feeding the regional boundary wave-field characteristics into a regional ocean model to generate an accurate nowcast.

The resulting nowcast may be fed into the data-augmented weather forecasting method described above.

D. Illustrative Data Processing System

Figure 6:
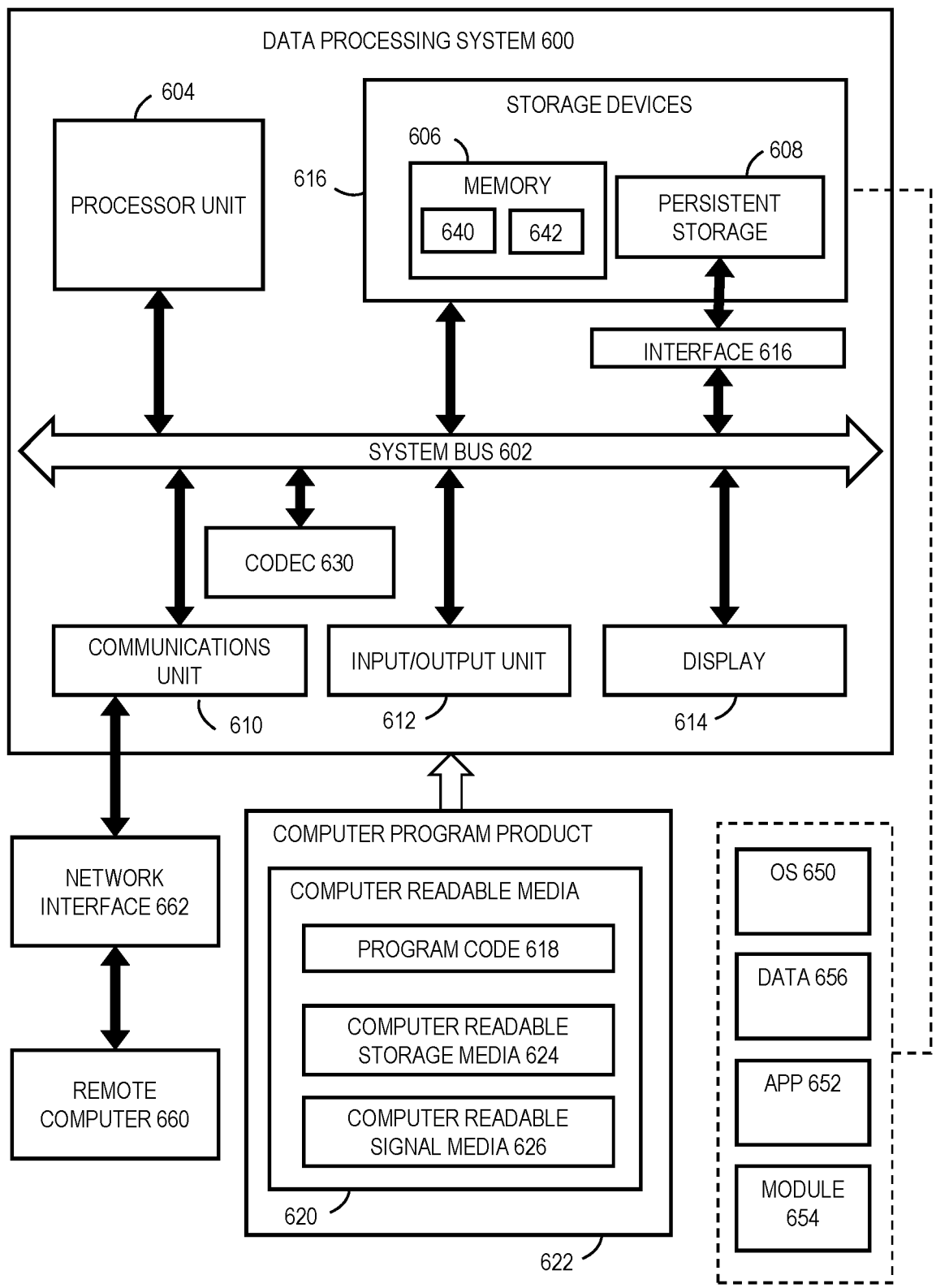
FIG. 6 is a schematic view of an illustrative data processing system suitable for use with aspects of the present disclosure.

As shown in FIG. 6, this example describes a data processing system 600 (also referred to as a computer, computing system, and/or computer system) in accordance with aspects of the present disclosure. In this example, data processing system 600 is an illustrative data processing system suitable for implementing aspects of the weather forecasting system. More specifically, in some examples, devices that are embodiments of data processing systems (e.g., smartphones, tablets, personal computers) may be utilized to process and/or execute steps of methods described herein. Additionally, devices that are embodiments of data processing systems may be utilized to process data as described in the present disclosure.

In this illustrative example, data processing system 600 includes a system bus 602 (also referred to as communications framework). System bus 602 may provide communications between a processor unit 604 (also referred to as a processor or processors), a memory 606, a persistent storage 608, a communications unit 610, an input/output (I/O) unit 612, a codec 630, and/or a display 614. Memory 606, persistent storage 608, communications unit 610, input/output (I/O) unit 612, display 614, and codec 630 are examples of resources that may be accessible by processor unit 604 via system bus 602.

Processor unit 604 serves to run instructions that may be loaded into memory 606. Processor unit 604 may comprise a number of processors, a multi-processor core, and/or a particular type of processor or processors (e.g., a central processing unit (CPU), graphics processing unit (GPU), etc.), depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device may include any suitable hardware capable of storing information (e.g., digital information), such as data, program code in functional form, and/or other suitable information, either on a temporary basis or a permanent basis.

Storage devices 616 also may be referred to as computer-readable storage devices or computer-readable media. Memory 606 may include one or more storage devices, such as a volatile storage memory 640 and a non-volatile memory 642. In some examples, a basic input/output system (BIOS), containing the basic routines to transfer information between elements within the data processing system 600, such as during start-up, may be stored in non-volatile memory 642. Persistent storage 608 may take various forms, depending on the particular implementation.

Persistent storage 608 may contain one or more components or devices. For example, persistent storage 608 may include one or more devices such as a magnetic disk drive (also referred to as a hard disk drive or HDD), solid state disk (SSD), floppy disk drive, tape drive, flash memory card, memory stick, and/or the like, or any combination of these. One or more of these devices may be removable and/or portable, e.g., a removable hard drive. Persistent storage 608 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 608 to system bus 602, a removable or non-removable interface is typically used, such as interface 628.

Input/output (I/O) unit 612 allows for input and output of data with other devices that may be connected to data processing system 600 (i.e., input devices and output devices). For example, input device 632 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 604 through system bus 602 via interface port(s) 636. Interface port(s) 636 may include, for example, a serial port, a parallel port, a game port, and/or a universal serial bus (USB).

Output devices 634 may use some of the same types of ports, and in some cases the same actual ports, as input device(s) 632. For example, a USB port may be used to provide input to data processing system 600 and to output information from data processing system 600 to an output device 634. Output adapter 638 is provided to illustrate that there are some output devices 634 (e.g., monitors, speakers, and printers, among others) which require special adapters. Output adapters 638 may include, e.g. video and sounds cards that provide a means of connection between the output device 634 and system bus 602. Other devices and/or systems of devices may provide both input and output capabilities, such as remote computer(s) 660. Display 614 may include any suitable human-machine interface or other mechanism configured to display information to a user, e.g., a CRT, LED, or LCD monitor or screen, etc.

Communications unit 610 refers to any suitable hardware and/or software employed to provide for communications with other data processing systems or devices. While communication unit 610 is shown inside data processing system 600, it may in some examples be at least partially external to data processing system 600. Communications unit 610 may include internal and external technologies, e.g., modems (including regular telephone grade modems, cable modems, and DSL modems), ISDN adapters, and/or wired and wireless Ethernet cards, hubs, routers, etc. Data processing system 600 may operate in a networked environment, using logical connections to one or more remote computers 660. A remote computer(s) 660 may include a personal computer (PC), a server, a router, a network PC, a workstation, a microprocessor-based appliance, a peer device, a smart phone, a tablet, another network note, and/or the like. Remote computer(s) 660 typically include many of the elements described relative to data processing system 600. Remote computer(s) 660 may be logically connected to data processing system 600 through a network interface 662 which is connected to data processing system 600 via communications unit 610. Network interface 662 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 630 may include an encoder, a decoder, or both, comprising hardware, software, or a combination of hardware and software. Codec 630 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 630 is depicted as a separate component, codec 630 may be contained or implemented in memory, e.g., non-volatile memory 642.

Non-volatile memory 642 may include read only memory (ROM), programmable ROM (PROM), electrically programmable ROM (EPROM), electrically erasable programmable ROM (EEPROM), flash memory, and/or the like, or any combination of these. Volatile memory 640 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 616, which are in communication with processor unit 604 through system bus 602. In these illustrative examples, the instructions are in a functional form in persistent storage 608. These instructions may be loaded into memory 606 for execution by processor unit 604. Processes of one or more embodiments of the present disclosure may be performed by processor unit 604 using computer-implemented instructions, which may be located in a memory, such as memory 606.

These instructions are referred to as program instructions, program code, computer usable program code, or computer-readable program code executed by a processor in processor unit 604. The program code in the different embodiments may be embodied on different physical or computer-readable storage media, such as memory 606 or persistent storage 608. Program code 618 may be located in a functional form on computer-readable media 620 that is selectively removable and may be loaded onto or transferred to data processing system 600 for execution by processor unit 604. Program code 618 and computer-readable media 620 form computer program product 622 in these examples. In one example, computer-readable media 620 may comprise computer-readable storage media 624 or computer-readable signal media 626.

Computer-readable storage media 624 may include, for example, an optical or magnetic disk that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory, that is connected to data processing system 600. In some instances, computer-readable storage media 624 may not be removable from data processing system 600.

In these examples, computer-readable storage media 624 is a non-transitory, physical or tangible storage device used to store program code 618 rather than a medium that propagates or transmits program code 618. Computer-readable storage media 624 is also referred to as a computer-readable tangible storage device or a computer-readable physical storage device. In other words, computer-readable storage media 624 is media that can be touched by a person.

Alternatively, program code 618 may be transferred to data processing system 600, e.g., remotely over a network, using computer-readable signal media 626. Computer-readable signal media 626 may be, for example, a propagated data signal containing program code 618. For example, computer-readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer-readable signal media 626 for use within data processing system 600. For instance, program code stored in a computer-readable storage medium in a server data processing system may be downloaded over a network from the server to data processing system 600. The computer providing program code 618 may be a server computer, a client computer, or some other device capable of storing and transmitting program code 618.

In some examples, program code 618 may comprise an operating system (OS) 650. Operating system 650, which may be stored on persistent storage 608, controls and allocates resources of data processing system 600. One or more applications 652 take advantage of the operating system's management of resources via program modules 654, and program data 656 stored on storage devices 616. OS 650 may include any suitable software system configured to manage and expose hardware resources of computer 600 for sharing and use by applications 652. In some examples, OS 650 provides application programming interfaces (APIs) that facilitate connection of different type of hardware and/or provide applications 652 access to hardware and OS services. In some examples, certain applications 652 may provide further services for use by other applications 652, e.g., as is the case with so-called "middleware." Aspects of present disclosure may be implemented with respect to various operating systems or combinations of operating systems.

The different components illustrated for data processing system 600 are not meant to provide architectural limitations to the manner in which different embodiments may be implemented. One or more embodiments of the present disclosure may be implemented in a data processing system that includes fewer components or includes components in addition to and/or in place of those illustrated for computer 600. Other components shown in FIG. 6 can be varied from the examples depicted. Different embodiments may be implemented using any hardware device or system capable of running program code. As one example, data processing system 600 may include organic components integrated with inorganic components and/or may be comprised entirely of organic components (excluding a human being). For example, a storage device may be comprised of an organic semiconductor.

In some examples, processor unit 604 may take the form of a hardware unit having hardware circuits that are specifically manufactured or configured for a particular use, or to produce a particular outcome or progress. This type of hardware may perform operations without needing program code 618 to be loaded into a memory from a storage device to be configured to perform the operations. For example, processor unit 604 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 618) may be implemented as hardware, e.g., by specifying an FPGA configuration using a hardware description language (HDL) and then using a resulting binary file to (re)configure the FPGA.

In another example, data processing system 600 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, system bus 602 may comprise one or more buses, such as a system bus or an input/output bus. Of course, the bus system may be implemented using any suitable type of architecture that provides for a transfer of data between different components or devices attached to the bus system. System bus 602 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small computer systems interface (SCSI)).

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in system bus 602.

E. Illustrative Distributed Data Processing System

Figure 7:
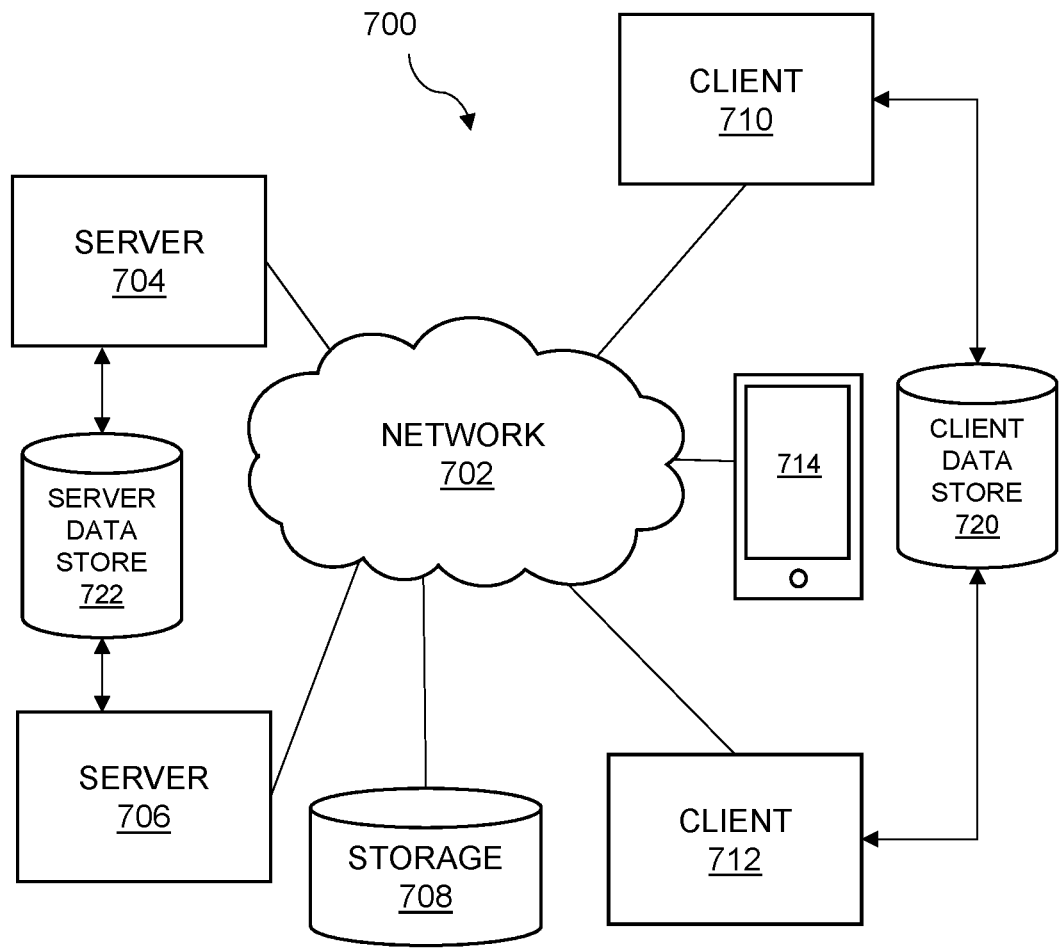
FIG. 7 is a schematic view of an illustrative computer network suitable for use with aspects of the present disclosure.

As shown in FIG. 7, this example describes a general network data processing system 700, interchangeably termed a computer network, a network system, a distributed data processing system, or a distributed network, aspects of which may be included in one or more illustrative embodiments of the weather forecasting system. For example, the ocean sensors may communicate with each other in a distributed sensing network. Additionally, or alternatively, the sensors may be in network communication with one or more servers. In some examples, servers and/or other computers may be utilized in a distributed network to execute or otherwise carry out steps of methods described herein.

It should be appreciated that FIG. 7 is provided as an illustration of one implementation and is not intended to imply any limitation with regard to environments in which different embodiments may be implemented. Many modifications to the depicted environment may be made.

Network system 700 is a network of devices (e.g., computers), each of which may be an example of data processing system 600, and other components. Network data processing system 700 may include network 702, which is a medium configured to provide communications links between various devices and computers connected within network data processing system 700. Network 702 may include connections such as wired or wireless communication links, fiber optic cables, and/or any other suitable medium for transmitting and/or communicating data between network devices, or any combination thereof.

In the depicted example, a first network device 704 and a second network device 706 connect to network 702, as do one or more computer-readable memories or storage devices 708. Network devices 704 and 706 are each examples of data processing system 600, described above. In the depicted example, devices 704 and 706 are shown as server computers, which are in communication with one or more server data store(s) 722 that may be employed to store information local to server computers 704 and 706, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 710 and 712 and/or a client smart device 714, may connect to network 702. Each of these devices is an example of data processing system 600, described above regarding FIG. 6. Client electronic devices 710, 712, and 714 may include, for example, one or more personal computers, network computers, and/or mobile computing devices such as personal digital assistants (PDAs), smart phones, handheld gaming devices, wearable devices, and/or tablet computers, and the like. In the depicted example, server 704 provides information, such as boot files, operating system images, and applications to one or more of client electronic devices 710, 712, and 714. Client electronic devices 710, 712, and 714 may be referred to as "clients" in the context of their relationship to a server such as server computer 704. Client devices may be in communication with one or more client data store(s) 720, which may be employed to store information local to the clients (e.g., cookie(s) and/or associated contextual information). Network data processing system 700 may include more or fewer servers and/or clients (or no servers or clients), as well as other devices not shown.

In some examples, first client electric device 710 may transfer an encoded file to server 704. Server 704 can store the file, decode the file, and/or transmit the file to second client electric device 712. In some examples, first client electric device 710 may transfer an uncompressed file to server 704 and server 704 may compress the file. In some examples, server 704 may encode text, audio, and/or video information, and transmit the information via network 702 to one or more clients.

Client smart device 714 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 700 may be stored in or on a computer-readable storage medium, such as network-connected storage device 708 and/or a persistent storage 608 of one of the network computers, as described above, and may be downloaded to a data processing system or other device for use. For example, program code may be stored on a computer-readable storage medium on server computer 704 and downloaded to client 710 over network 702, for use on client 710. In some examples, client data store 720 and server data store 722 reside on one or more storage devices 708 and/or 608.

Network data processing system 700 may be implemented as one or more of different types of networks. For example, system 700 may include an intranet, a local area network (LAN), a wide area network (WAN), or a personal area network (PAN). In some examples, network data processing system 700 includes the Internet, with network 702 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 702 may be referred to as a "cloud." In those examples, each server 704 may be referred to as a cloud computing node, and client electronic devices may be referred to as cloud consumers, or the like. FIG. 7 is intended as an example, and not as an architectural limitation for any illustrative embodiments.

F. Illustrative Combinations and Additional Examples

This section describes additional aspects and features of data-augmented weather forecasting systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A system for forecasting weather, the system comprising:
one or more processors;
a memory; and
a plurality of instructions stored in the memory and executable by the one or more processors to train a machine learning model by:
generating a first hindcast of a first historical weather state for a selected geographical region and a first selected timeframe;
generating a second hindcast of a second historical weather state for the selected geographical region and a second selected timeframe;
generating a reforecast of the second historical weather state for the selected geographical region, using a weather forecast model and a first set of data associated with conditions prior to the first selected timeframe, such that an actual forecasting error is defined as a difference between the reforecast and the second hindcast; and
training the machine learning model to estimate a predicted forecasting error, given the first hindcast and the reforecast as inputs.

A1. The system of A0, wherein generating the second hindcast includes using a second set of data associated with conditions during the selected timeframe.

A2. The system of A0 or A1, wherein the plurality of instructions are further executable by the one or more processors to:
receive a forecast of a future weather state generated by the weather forecast model;
estimate the predicted forecasting error associated with the forecast, using the machine learning model; and
adjust the forecast using the predicted forecasting error.

A3. The system of any one of paragraphs A0 through A2, wherein the weather forecast model is physics based.

A4. The system of any one of paragraphs A0 through A3, wherein the machine learning model comprises a residual encoder-decoder neural network.

B0. A system for forecasting weather, the system comprising:
one or more processors;
a memory; and
a plurality of instructions stored in the memory and executable by the one or more processors to forecast a weather state for a selected geographical region by:
receiving, as an input, a first forecast of the weather state for the selected geographical region and a nowcast for the selected geographical region;
using the first forecast and the nowcast as inputs to a trained machine learning model, predicting a forecasting error associated with the first forecast; and
generating a second forecast by adjusting the first forecast using the predicted forecasting error.

B1. The system of B0, wherein the forecasting error comprises an expected difference between the weather state and the first forecast of the weather state.

B2. The system of B0 or B1, wherein the first forecast corresponds to a selected physics-based forecasting model.

B3. The system of any one of paragraphs B0 through B2, wherein the machine learning model comprises a residual encoder-decoder neural network.

C0. A computer-implemented method for forecasting weather, the method comprising:
generating, using one or more processors, a first hindcast of a first historical weather state for a selected geographical region and a first selected timeframe;
generating, using the one or more processors, a second hindcast of a second historical weather state for the selected geographical region and a second selected timeframe;
generating, using the one or more processors, a reforecast of the second historical weather state for the selected geographical region and the second selected timeframe, as of the first selected timeframe, using a weather forecast model and a first set of data corresponding to conditions during or before the first selected timeframe, such that an actual forecasting error is defined as a difference between the reforecast and the second hindcast; and
training a machine learning model to estimate a predicted forecasting error, given the first hindcast and the reforecast as inputs.

C1. The method of C0, further comprising:
receiving a weather forecast generated by the weather forecast model;
receiving a nowcast generated using data corresponding to existing conditions;
estimating the predicted forecasting error for the weather forecast using the trained machine learning model, given the nowcast and the weather forecast as inputs; and
adjusting the weather forecast by the predicted forecasting error to produce an enhanced weather forecast.

C2. The method of C0 or C1, wherein the weather forecast model is physics based.

C3. The method of any one of paragraphs C0 through C2, wherein the second hindcast is performed using a second set of data corresponding to conditions during the second selected timeframe.

C4. The method of any one of paragraphs C0 through C3, wherein the machine learning model comprises a residual encoder-decoder neural network.

D0. A computer-implemented method for forecasting weather, the method comprising:
using a trained machine learning model to determine a predicted forecasting error in a weather forecast, wherein the machine learning model is configured to estimate the predicted forecasting error given the weather forecast and a set of existing conditions; and
adjusting the weather forecast by the predicted forecasting error to produce an enhanced weather forecast.

D1. The method of D0, wherein the set of existing conditions comprises a nowcast.

D2. The method of D1, further comprising generating the nowcast using data from an array of sensors deployed in a body of water.

D3. The method of D2, wherein at least some of the array of sensors are deployed in a free-floating configuration.

D4. The method of D2, wherein the data includes information regarding wave activity in the body of water.

D5. The method of any one of paragraphs D0 through D4, wherein the machine learning model comprises a residual encoder-decoder neural network.

D6. The method of any one of paragraphs D0 through D5, wherein the machine learning model comprises a deep convolutional neural network.

Advantages, Features, and Benefits

The different embodiments and examples of the data-augmented weather forecasting systems described herein provide several advantages over known solutions. For example, illustrative embodiments and examples described herein allow for more accurate ocean weather forecasting.

Additionally, and among other benefits, illustrative embodiments and examples described herein provide a more accurate nowcast (i.e., a more accurate description of the present ocean weather conditions).

Additionally, and among other benefits, illustrative embodiments and examples described herein provide an increase in forecast accuracy without increasing the computational complexity.

Additionally, and among other benefits, illustrative embodiments and examples described herein provide an augmentation to forecast models utilizing real-time or near real-time ocean observations.

Additionally, and among other benefits, efficiencies resulting from illustrative embodiments and examples described herein provide a decreased computational cost in large-network data assimilation. By modeling the error system rather than the physics system, the present disclosure is orders of magnitude less complex, while remaining heavily constrained by the physics of weather models.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A computer-implemented method for forecasting weather, the method comprising:
   training a machine learning model comprising:
   generating a hindcast of a first historical weather state for a selected geographical region and a selected timeframe;
   generating a reforecast of a second historical weather state for the selected geographical region, using a weather forecast model and a set of historical conditions prior to the selected timeframe; and
   training the machine learning model to estimate a predicted forecasting error in the weather forecast model, given the first hindcast and the reforecast as inputs;
   using the trained machine learning model to determine the predicted forecasting error in the weather forecast model, wherein the machine learning model is configured to determine the predicted forecasting error given a weather forecast of the weather forecast model and a set of real-time metocean conditions; and
   adjusting the weather forecast model using the predicted forecasting error to produce an augmented weather forecast.

2. The method of claim 1, wherein the set of real-time metocean conditions comprises a nowcast.

3. The method of claim 2, further comprising:
   using an array of metocean sensors deployed in a body of water to obtain sensor data; and
   generating the nowcast using the sensor data.

4. The method of claim 3, wherein at least some of the array of sensors are deployed in a free-floating configuration.

5. The method of claim 3, wherein at least some of the array of sensors are autonomous.

6. The method of claim 3, wherein the sensor data includes information regarding wave activity in the body of water.

7. The method of claim 1, wherein the machine learning model comprises a deep convolutional neural network.

8. The method of claim 1, wherein the machine learning model comprises a residual encoder-decoder neural network.

9. The method of claim 1, wherein the weather forecast corresponds to a selected physics-based forecasting model.

10. The method of claim 1, wherein the weather forecast predicts a weather state, and the forecasting error comprises an expected difference between the weather state and the weather forecast of the weather state.

11. A system for forecasting weather, the system comprising:
   one or more processors;
   one or more memories; and
   a plurality of instructions stored in the one or more memories and executable by the one or more processors to forecast a weather state for a selected geographical region by:
   training a machine learning model to estimate a predicted forecasting error in a weather forecast model using training data comprising:
   a hindcast of a first historical weather state for the selected geographical region and a selected timeframe; and
   a reforecast of a second historical weather state for the selected geographical region, the reforecast generated using the weather forecast model and a set of historical conditions prior to the selected timeframe;
   receiving, as an input, a first forecast of the weather state from the weather forecast model for the selected geographical region and a nowcast for the selected geographical region;

using the first forecast and the nowcast as inputs to the trained machine learning model, predicting a forecasting error associated with the weather forecast model; and generating a second forecast by adjusting the weather forecast model using the predicted forecasting error.

12. The system of claim 11, wherein the forecasting error comprises an expected difference between the weather state and the first forecast of the weather state.

13. The system of claim 11, wherein the first forecast corresponds to a selected physics-based forecasting model.

14. The system of claim 11, wherein the machine learning model comprises a residual encoder-decoder neural network.

15. The system of claim 11, wherein the instructions are further executable by the one or more processors to generate the nowcast using sensor data from an array of metocean sensors deployed in a body of water comprising the geographical region.

16. A system for forecasting weather, the system comprising:
one or more processors;
a memory; and
a plurality of instructions stored in the memory and executable by the one or more processors to train a machine learning model by:
generating a first hindcast of a first historical weather state for a selected geographical region and a first selected timeframe;
generating a second hindcast of a second historical weather state for the selected geographical region and a second selected timeframe;
generating a reforecast of the second historical weather state for the selected geographical region, using a weather forecast model and a first set of data associated with conditions prior to the first selected timeframe, such that an actual forecasting error is defined as a difference between the reforecast and the second hindcast; and
training the machine learning model to estimate a predicted forecasting error in the weather forecast model, given the first hindcast and the reforecast as inputs.

17. The system of claim 16, wherein generating the second hindcast includes using a second set of data associated with conditions during the selected timeframe.

18. The system of claim 16, wherein the plurality of instructions are further executable by the one or more processors to:
receive a forecast of a future weather state generated by the weather forecast model;
estimate the predicted forecasting error associated with the forecast, using the machine learning model; and
adjust the weather forecast model using the predicted forecasting error.

19. The system of claim 16, wherein the weather forecast model is physics based.

20. The system of claim 16, wherein the machine learning model comprises a residual encoder-decoder neural network.

* * * * *